US011910141B2

(12) United States Patent
Kwiram

(10) Patent No.: US 11,910,141 B2
(45) **Date of Patent: *Feb. 20, 2024**

(54) COMPACT SPEAKER SYSTEM WITH CONTROLLED DIRECTIVITY

(71) Applicant: LAMASSU LLC, San Jose, CA (US)

(72) Inventor: Andrew Brandt Kwiram, Piedmont, CA (US)

(73) Assignee: Lamassu LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/144,427

(22) Filed: Jan. 8, 2021

(65) Prior Publication Data

US 2021/0136473 A1 May 6, 2021

Related U.S. Application Data

(63) Continuation of application No. 16/232,471, filed on Dec. 26, 2018, now Pat. No. 10,893,345.

(51) Int. Cl.

| | |
|---|---|
| ***H04R 1/02*** | (2006.01) |
| ***H04R 1/40*** | (2006.01) |
| ***H04R 5/02*** | (2006.01) |
| ***H04R 5/04*** | (2006.01) |

(52) U.S. Cl.

CPC ............. *H04R 1/025* (2013.01); *H04R 1/403* (2013.01); *H04R 5/02* (2013.01); *H04R 5/04* (2013.01)

(58) Field of Classification Search

CPC .......... H04R 1/025; H04R 1/403; H04R 5/02; H04R 5/04

USPC ......................................... 381/182, 387, 304

See application file for complete search history.

(56) References Cited

U.S. PATENT DOCUMENTS

| | | | | |
|---|---|---|---|---|
| 5,388,162 | A | 2/1995 | Sohn | |
| 5,870,484 | A * | 2/1999 | Greenberger | H04S 3/002 381/300 |
| 2003/0068058 | A1 | 4/2003 | Noselli | |
| 2005/0018868 | A1 | 1/2005 | Chick | |
| 2007/0081680 | A1 * | 4/2007 | Yen | H04R 1/403 381/160 |
| 2014/0064522 | A1 | 3/2014 | Litovsky et al. | |
| 2017/0366895 | A1 | 12/2017 | Risberg | |
| 2018/0167720 | A1 | 6/2018 | Schuemann | |
| 2018/0262836 | A1 | 9/2018 | Janes | |

OTHER PUBLICATIONS

International Search Report and Written Opinion; Corresponding PCT application Serial No. PCT/US2019/068358; Authorized Officer Min Jeong Kang; dated Apr. 23, 2020.

* cited by examiner

*Primary Examiner* — Vivian C Chin
*Assistant Examiner* — Douglas J Suthers
(74) *Attorney, Agent, or Firm* — Renner, Otto, Boisselle & Sklar, LLP

(57) ABSTRACT

A speaker system is disclosed with user-selectable output modes including controlled directivity output modes (e.g. selectable monopole, dipole, or cardioid radiation patterns), that may be implemented with adjustable electronic delay of out-of-phase driver elements, and that provides for both even-orderharmonic distortion reduction and driver force cancellation in a compact assembly suitable for home or studio use.

19 Claims, 7 Drawing Sheets

COMPACT SPEAKER SYSTEM WITH CONTROLLED DIRECTIVITY

CROSS-REFERENCE TO RELATED APPLICATIONS

This application is a continuation of U.S. patent application Ser. No. 16/232,471, filed on Dec. 26, 2018, the disclosure of which is incorporated herein by reference in its entirety.

FIELD OF THE INVENTION

The present disclosure relates to a compact speaker system. More particularly, the present disclosure relates to a compact speaker system with user-selectable output modes including controlled directivity output modes (e.g. selectable monopole, dipole, or cardioid radiation patterns).

BACKGROUND

Reproduction of recorded or amplified sound that is faithful to the original source presents innumerable challenges to the loudspeaker designer. Accurate reproduction of bass and sub-bass frequencies is particularly challenging given the characteristics and behaviors of low frequency sound waves.

The challenge is acute in non-anechoic rooms that are considered to be "acoustically small." A non-anechoic room may be considered acoustically small if the dimensions of the room represent a few multiples or less of the sound wavelengths being generated. For example, a 20 Hz sound wave (within the range of Western instrumental music) has a wavelength of approximately 17 m in air at a temperature of 70° F., which is much greater than the maximum dimension of a typical domestic room.

When the dimensions of a non-anechoic room in which a monopolar speaker is placed are such that the maximum dimension is only a few multiples, or less, of the low-frequency wavelengths reproduced, numerous wall, ceiling, and floor reflections of the speaker output result in standing waves in the room, with deleterious impacts on sound quality. A standing wave is the result of constructive or destructive interference between two waves traveling in opposite directions, typically created by a wave meeting its reflection from a room boundary.

The generation of standing waves has two deleterious impacts of primary importance: first, audible peaks and nulls in frequency response are created (related to the position of the speaker(s) and the room contents and boundaries), and second, these peaks and nulls are by their nature highly localized, with rapidly changing pressure and velocity characteristics by location in the room. As a result, movement of the listening position even by small distances may result in significant and audible changes in bass response.

By their nature, monopolar speaker designs (e.g., sealed box and ported box designs) generate numerous standing waves in non-anechoic acoustically small rooms. This is because at low frequencies, i.e. when the size of the reproduced wavelength is large in relation to the size of the driver creating the sound, monopolar speakers are omnidirectional. That is, the sound radiation pattern is spherical and interacts maximally with room boundaries.

Controlling the directivity of sound waves generated by a loudspeaker can be used to mitigate some of the problems outlined above, i.e., by interacting less or with fewer room boundaries and thereby creating fewer reflections and standing waves.

One existing controlled directivity design is the conventional dipole speaker. Because of cancellation between the in- and out-of-phase signal generated, a dipole bass speaker may produce a figure-eight radiation pattern with nulls at the sides. The dipole speaker thus interacts much less than a monopolar speaker does with room boundaries positioned to the sides of the speaker. A dipole speaker, because it cannot produce any net pressure change in the listening room, tends to produce less noise in adjacent rooms to the listening room than a system that can pressurize the room (e.g. monopole and cardioid designs), which can be advantageous in urban environments. However, the ability of the dipole driver to create sound depends on the difference in path length between the front and rear of the driver. As this path length becomes smaller in relation to the wavelength reproduced, i.e. at progressively lower frequencies, the dipole speaker's ability to create sound becomes progressively diminished, to a point at which no more intended sound is created.

Dipole speakers thus require large driver surface area to produce low frequencies at high volume, create significant aerodynamic noise, and in non-anechoic rooms cannot produce bass below the frequency with a wavelength corresponding to twice the maximum room dimension, i.e. the room's fundamental resonance.

Cardioid speakers have also been employed to provide controlled output directivity. A cardioid speaker is in principle a dipole speaker with a separation distance between the in-phase radiator and the out-of-phase radiator (represented in a conventional dipole by the front and rear sides of the driver). When correctly implemented a cardioid design may produce a radiation pattern similar to that of a dipole, however with an enlarged front radiation pattern and a reduced rear radiation pattern.

Both dipole and cardioid speaker designs provide controlled directivity, i.e. they interact less with the room than a monopolar speaker and may thus create much less severe standing wave patterns. Both dipole and cardioid speakers also provide a more favorable power response than a monopolar radiator at low frequencies, that is, a more favorable ratio between the power of the direct (unreflected) sound perceived by the listener and the power of the reflected sound field experienced with a slight delay.

However, unlike a dipole speaker, a cardioid speaker's output can extend to arbitrarily low frequencies, including frequencies below the fundamental room resonance. And unlike a monopole speaker, a cardioid speaker can create a large "sweet spot" for the listener; changes in frequency response may be much smaller as the listening position is changed.

Conventional cardioid speakers used primarily in professional sound reinforcement applications create controlled-directivity output but use conventional Thiele-Small driver loading techniques, i.e. techniques that optimize for use of the driver(s) at frequencies above its fundamental resonance frequency as-mounted in a sealed or ported cabinet. As one skilled in the art would understand, Thiele-Small parameters are a set of electromechanical parameters that predict specified low frequency performance of a loudspeaker driver mounted in an enclosure of a defined volume. Using these measured parameters, a loudspeaker designer may estimate or simulate the sound output of a system comprising a loudspeaker and enclosure. These speaker design techniques rely on ever larger cabinet volumes to reduce the speaker's low frequency limit and in the case of ported designs cannot extend below the port tuning frequency. Such large cabinet volumes as may be required to reproduce very low frequency sounds are often not convenient, e.g. in domestic living spaces or studio control rooms.

Certain extant monopole speakers used for low frequency reproduction have addressed the disadvantage of large cabinet volumes by using so-called Extended Low Frequency ("ELF") driver loading approaches, in combination with significant equalization. In an ELF speaker, the speaker cabinet volume is less than would be typical with a conventional Thiele-Small approach, which results in higher cabinet air pressures resisting driver motion and a higher fundamental driver resonance. In such designs, the driver is operated below its fundamental resonance frequency as-mounted in a sealed cabinet.

To drive such a speaker to required listening volumes requires significantly more amplifier power than is required, given the same driver, for a speaker designed with conventional Thiele-Small techniques (thereby resulting in a significantly larger enclosure than the ELF design). ELF speaker designs also require significant positive electronic equalization of low frequencies to maintain flat output.

Conventional speaker design approaches do not provide for selectable directivity or "output pattern," i.e. monopole (spherical/no directivity), dipole (so-called figure eight directivity), or cardioid (a directivity similar to dipole with an enlarged front lobe and reduced rear lobe). However users may wish to choose which output pattern to use, and may wish to change the output from day to day, as each output pattern has certain advantages and disadvantages. A monopole radiator placed in the corner of a non-anechoic room stimulates all room modes maximally, and in conjunction with room correction (i.e. the electronic equalization downward of peaks in the amplitude response) this may be a desired mode of operation, in particular to achieve maximum loudness for a given amplifier power capability. A dipole radiator provides controlled directivity and typically produces less leakage noise of sound into adjacent rooms, which may be desirable for those living in apartments or other dense urban housing environments. A cardioid radiator provides controlled directivity with a broad sweet spot and reduced standing waves (compared to a monopole) but can extend to (in theory) arbitrarily low frequencies regardless of room dimensions, unlike a dipole.

Conventional speaker design approaches, both cardioid and monopolar (including ELF or conventional Thiele-Small designs) are not concerned with even order harmonic distortion, in particular second harmonic distortion. As second harmonic distortion typically dominates the harmonic distortion spectrum of a speaker driver, and since the human ear is much more sensitive to the frequencies of the distortion product in the bass than it is to the fundamental tone, second harmonic distortion is at its most audible at low frequencies.

Conventional speaker design approaches also do not attempt to cancel the vibratory forces generated by moving drivers and therefore employ massively built and damped cabinets, which can be costly and heavy, to reduce the vibratory energy re-radiated from the cabinet into the room.

There is thus a need for a loudspeaker system that provides user-selectable modes of operation, including controlled directivity output modes, with the ability to accurately reproduce sound of arbitrarily low frequency (given sufficient driver surface area, excursion capability, and amplifier power), that cancels unwanted cabinet vibratory energy, and reduces even-order harmonic distortion—in particular second-order harmonic distortion. There is a further need to optimize the radiation pattern in dipole mode, and for a chosen crossover frequency (to other speaker radiating elements such as tweeters) in cardioid mode, by means of adjustable delay of out-of-phase elements.

There is a further need for a loudspeaker system providing these characteristics in a compact package suitable for home or studio use.

SUMMARY

In one embodiment, a speaker system includes a plurality of pairs of sealed speaker cabinets. The speaker system further includes first and second speaker drivers mounted to each of the pairs of sealed speaker cabinets. Each sealed speaker cabinet houses a driver, wherein each driver faces outward from the sealed speaker cabinet in which it is mounted. The speaker system also includes an audio processing apparatus configured to receive a first audio signal and to process the first audio signal to generate a second audio signal. The first audio signal is delivered to the first and second speaker drivers in at least one of the pairs of sealed speaker cabinets, and the second audio signal is delivered to the first and second speaker drivers in at least one other of the pairs of sealed speaker cabinets. Each sealed speaker cabinet in each pair of sealed speaker cabinets is rigidly secured, either directly or indirectly, to the other sealed speaker cabinet in that pair of sealed speaker cabinets.

In another embodiment, a speaker system includes a first pair of sealed speaker cabinets, including a first sealed speaker cabinet rigidly secured to a second sealed speaker cabinet. The speaker system further includes a first speaker driver mounted in the first sealed speaker cabinet, wherein the first speaker driver has a first side that emits primary sound radiation and a second side opposite the first side, and wherein the first side of the first speaker driver faces outward from the first sealed speaker cabinet. The speaker system also includes a second speaker driver mounted to the second sealed speaker cabinet, wherein the second speaker driver has a first side that emits primary sound radiation and a second side opposite the first side, and wherein the first side of the second speaker driver faces toward an inside of the second sealed speaker cabinet. The speaker system further includes a second pair of sealed speaker cabinets, including a third sealed speaker cabinet rigidly secured to a fourth sealed speaker cabinet. The speaker system also has a third speaker driver mounted in the third sealed speaker cabinet, wherein the third speaker driver has a first side that emits primary sound radiation and a second side opposite the first side, and wherein the first side of the third speaker driver faces outward from the third sealed speaker cabinet. The speaker system further has a fourth speaker driver mounted to the fourth sealed speaker cabinet, wherein the fourth speaker driver has a first side that emits primary sound radiation and a second side opposite the first side, and wherein the first side of the fourth speaker driver faces toward an inside of the fourth sealed speaker cabinet. The speaker system further includes an audio processing apparatus in signal communication with the first and second speaker drivers and configured to receive a first audio signal and to delay and invert a phase of the first audio signal to generate a second audio signal. The first audio signal is delivered to the first and second speaker drivers. The second audio signal is delivered to the third and fourth speaker drivers.

In yet another embodiment, a speaker system has a pair of sealed speaker cabinets, including a first sealed speaker cabinet rigidly secured to a second sealed speaker cabinet.

The speaker system further includes a first speaker driver mounted in the first sealed speaker cabinet, wherein the first speaker driver has a first side that emits primary sound radiation and a second side opposite the first side, and wherein the first side of the first speaker driver faces outward from the first sealed speaker cabinet. The speaker system also includes a second speaker driver mounted to the second sealed speaker cabinet, wherein the second speaker driver has a first side that emits primary sound radiation and a second side opposite the first side, and wherein the first side of the second speaker driver faces toward an inside of the second sealed speaker cabinet. The speaker system further includes an audio processing apparatus in signal communication with the first and second speaker drivers and configured to receive a first audio signal and to process the first audio signal to generate a second audio signal, wherein the second audio signal is delivered to the first and second speaker drivers.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

A speaker system with the option to select monopolar (omnidirectional), or controlled directivity output in dipole or cardioid radiation patterns is disclosed. In exemplary embodiments, the speaker is implemented with adjustable electronic delay of out-of-phase elements, as well as physical arrangement of drivers that provides for both force cancellation and even-order harmonic distortion cancellation (including in particular second-order harmonic distortion cancellation) in a compact assembly suitable for home or studio use.

Figure 1:
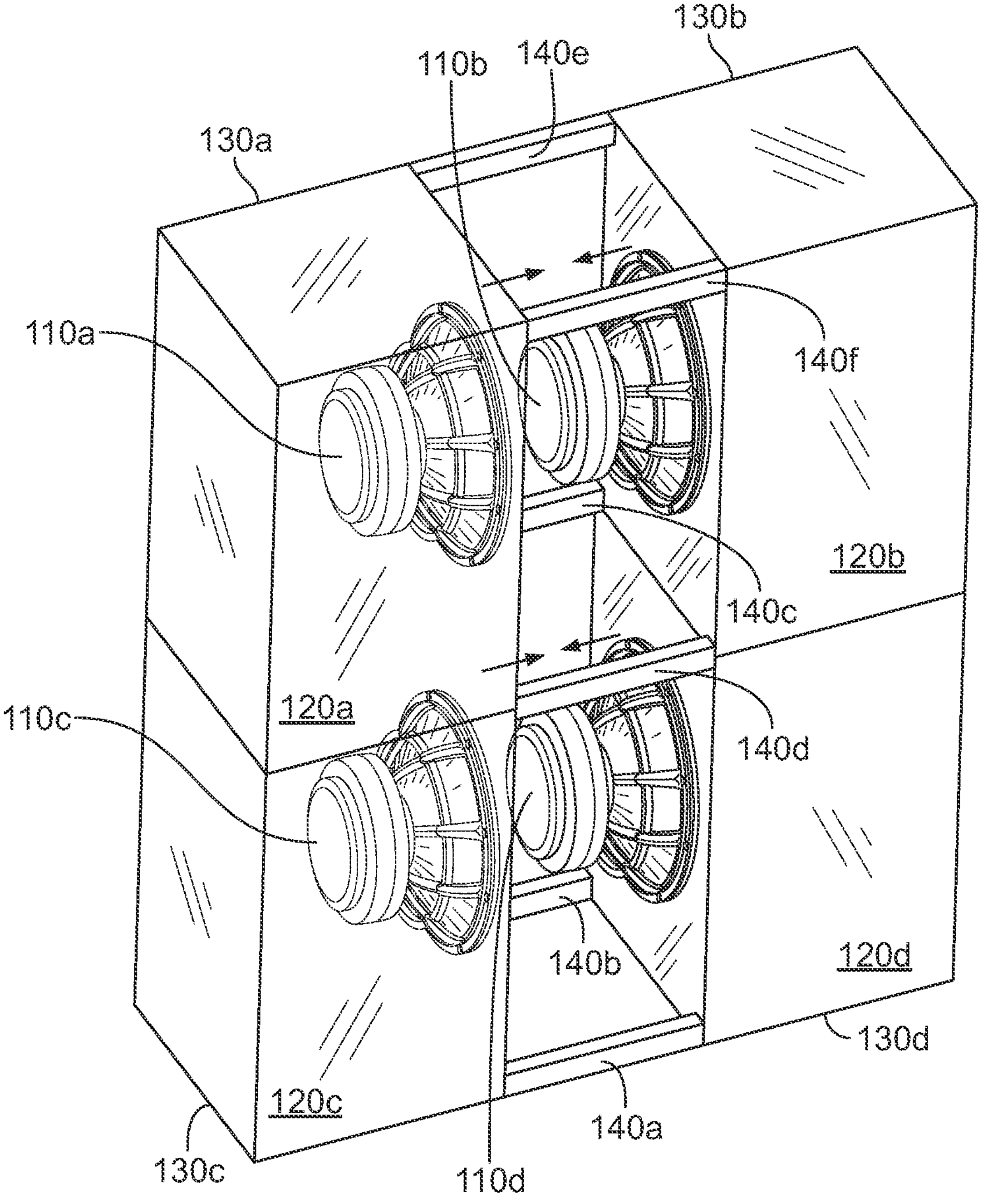
FIG. 1 is a perspective view of one embodiment of a loudspeaker assembly.

FIG. 1 is a perspective view of one embodiment of a loudspeaker assembly. In the illustrated embodiment, the loudspeaker assembly includes four speaker drivers 110*a*, 110*b*, 110*c*, and 110*d*. In one embodiment, the speaker drivers 110*a*, 110*b*, 110*c*, and 110*d* are each subwoofers, or loudspeakers dedicated to the reproduction of low-pitched audio frequencies known as bass and sub-bass. An exemplary frequency range for a subwoofer is about 20-200 Hz for consumer products, below 100 Hz for professional live sound, and below 80 Hz in THX-approved systems. In one embodiment, the speakers range in size from 3 inches to 21 inches in diameter. In an alternative embodiment, the speakers are less than 3 inches in diameter. In another alternative embodiment, the speakers have a diameter between 21 inches and 60 inches. Here, each of the speaker drivers 110*a*, 110*b*, 110*c*, and 110*d* are identical. In an alternative embodiment, one or more of the speakers may be different from each other.

Each speaker driver may be loaded in an identical sealed chamber (120*a*, 120*b*, 120*c*, 120*d*) that provides less volume than Thiele-Small modeling would suggest, and results in a system in which the driver is operated below its fundamental resonance frequency as-mounted in the sealed chamber. Separate sealed cabinets 130*a*, 130*b*, 130*c*, and 130*d* are provided, which define sealed chambers 120*a*-120*d*, and house drivers 110*a*-110*d*.

In the illustrated embodiment, each sealed cabinet is formed as a single unit that accommodates two drivers, with a partition fixed in the interior of the cabinet to define a separate chamber for each driver. Other configurations may be possible provided that each speaker driver (or multiples of drivers experiencing identical input signals) is provided with an independent sealed chamber.

In exemplary embodiments, the drivers used may be any conventional cone driver. In alternate embodiments, drivers other than the cone variety may be used, but as discussed below, the reduction in even-order harmonic distortion may be diminished.

In the exemplary four-driver configuration, two drivers are connected to an in-phase signal, while the remaining two drivers are connected to a signal identical to the in-phase signal in monopole mode, or identical except for delay and phase inversion in dipole mode, or identical except for delay, phase inversion, and potentially amplitude in cardioid mode.

As shown in FIG. 1, for each facing pair of drivers, one driver is mounted with its motor inside its sealed chamber, and one is mounted with its motor outside its chamber, the motor in this case facing the opposite driver. Each driver pair is mounted such that the motor structure of the "face-in" driver nests with the "face-out" membrane of the other driver.

Figure 2:
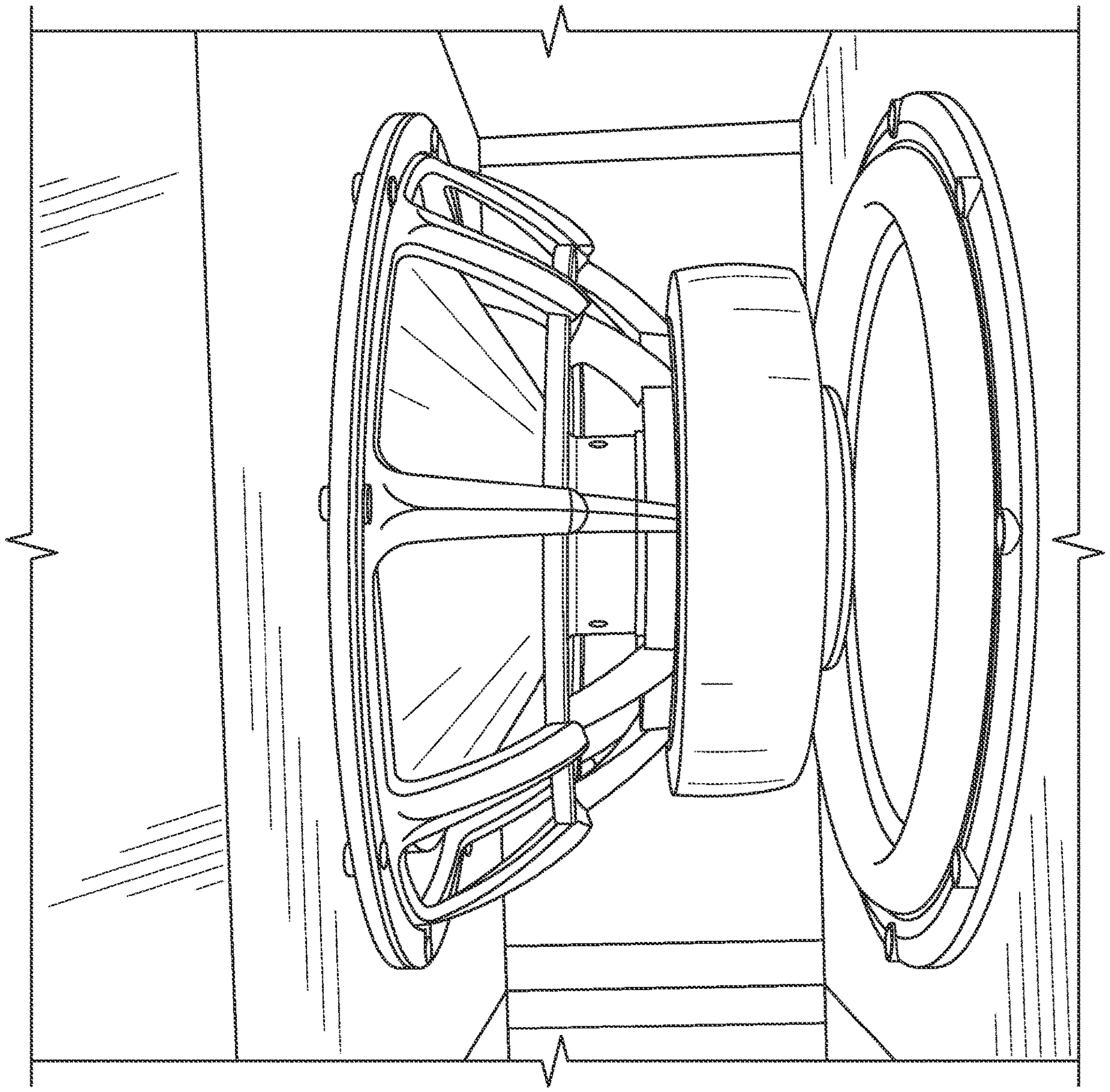
FIG. 2 is a partial side view of the loudspeaker shown in FIG. 1.

FIG. 2 is a partial side view of the loudspeaker shown in FIG. 1, illustrates an exemplary face-in/face-out driver configuration. The pair of loudspeakers is wired such that the membranes of the two drivers move toward each other (and subsequently away from each other) simultaneously upon the application of an input signal. As will be appreciated by those of skill in the art, alternate driver arrangements may be used, including a configuration in which each driver is mounted with its motor inside the sealed chamber.

Sealed cabinets 130*a*-130*d* may be formed from any material. A material may be selected that is capable of supporting the drivers and defining the sealed chambers. Exemplary suitable materials include, without limitation, wood, particle board, carbon fiber, metal, fiberglass, polymer, ceramic, concrete, stone, composite materials, or the like. Aesthetic considerations may be taken into consideration in selecting the material for the sealed cabinets. Sealed cabinets may be formed from individual pieces of the desired material that are joined using conventional methods such as routing, adhesives, epoxy, nails, screws, and the like. The enclosure should be substantially free from pressure leaks to maximize the performance of the speaker.

The properties of the driver used, the amount of required equalization, and available amplifier power will dictate the specific size of the cabinet to be used. Software programs may be used to calculate the optimal cabinet volume.

In each driver pair, the separate parallel sealed chambers may be rigidly joined either directly (e.g. via braces or crossbars) or indirectly (e.g. by being bolted to a shared rigid floor, ceiling, or similar element). Referring back to FIG. 1, exemplary braces 140*a*, 140*b*, 140*c*, 140*d*, 140*e*, and 140*f* are shown joining the front and rear assemblies. Braces may be formed from any material that is capable of transmitting the force generated by the speaker drivers during operation.

Figure 3:
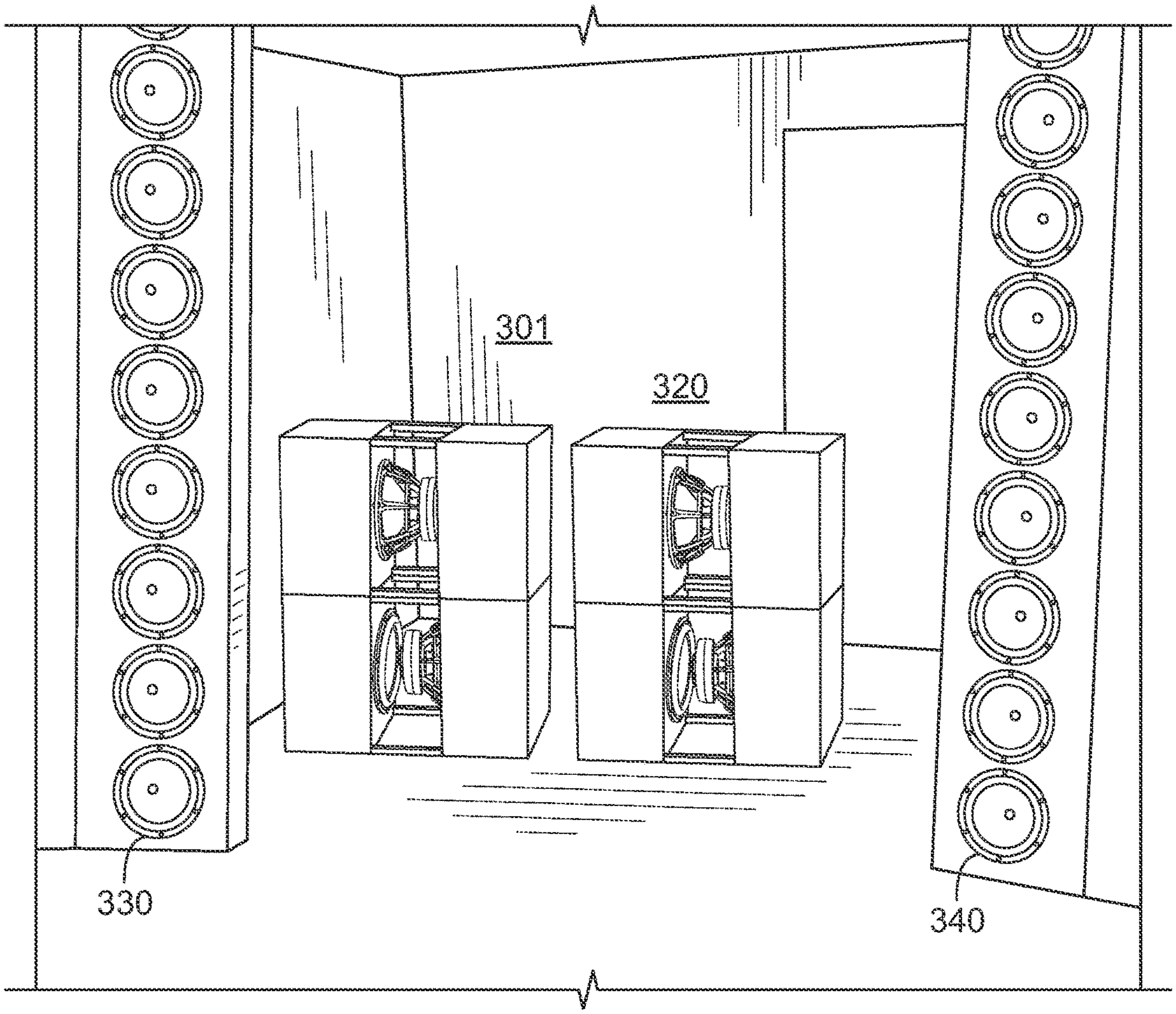
FIG. 3 is a perspective view of one embodiment of a loudspeaker assembly.

Referring to FIG. 3, an exemplary stereo listening configuration is shown with two functional units (310, 320) each comprising a pair of drivers, and a pair of main speaker arrays (330, 340) for higher frequencies.

Braces may be formed from a rigid material such as wood, plywood, medium-density fiberboard, steel, aluminum, composite material, carbon fiber, polymers, ceramic, or the like. The braces may have features that enhance the strength of the brace while allowing it to remain lightweight and aesthetically pleasing and may take any suitable form such as tubes or other shapes that enhance the strength, self-damping, or other desirable properties of the brace.

Figure 4:
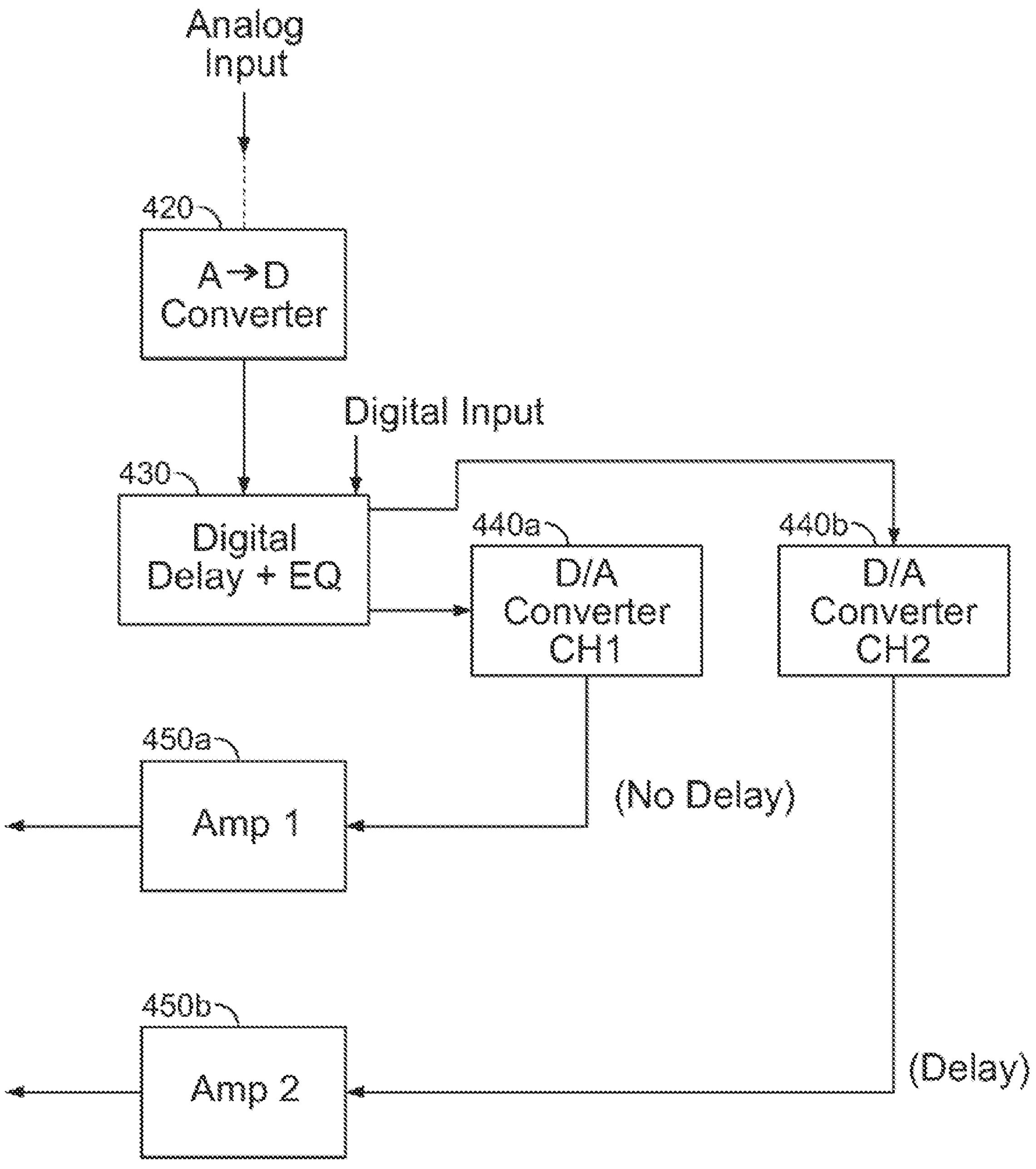
FIG. 4 is a block level diagram of the functional components of one embodiment of a loudspeaker system.

Amplification and signal processing functionality may be provided, and implemented within the speaker assembly, or as separate components outside the unit. FIG. 4 shows a block level diagram of the functional units of the system, which may include analog-digital and digital-analog converters, amplification, equalization, and electronic signal delay.

The analog-digital and digital-analog converters may be any type of converter that is capable of converting a signal with desired precision. It should be noted that where the system is implemented to operate at a low frequency range, less resolution in the analog-digital and digital-analog conversion may be necessary compared to an implementation in which the speaker is used across a broad frequency range.

An amplifier for each signal (in-phase and out-of-phase) may also be implemented, and should be able to operate within the frequency range in which the speaker is used.

In one embodiment, the system incorporates a delay circuit and a phase inversion circuit to feed an optionally delayed and phase-inverted signal to the respective driver pair. The delay may be adjusted by any electronic means. In monopole mode the delay is set to zero. In dipole mode the delay may be set to approximate path length differences (as created in a conventional dipole system by a baffle and any baffle extensions applied to the system to extend the path length between front and rear outputs of the system) in a range of e.g., 0.5-2.0 milliseconds, which corresponds to path length differences of approximately 0.17 meters and 0.69 meters, respectively (assuming the speed of sound is approximately 343 meters per second at and near sea level—the path length difference is equal to the delay multiplied by the speed of sound). In cardioid mode a constant delay optimally corresponds to half the period of the desired crossover frequency, but may also be programmed to vary with frequency. For example if the desired crossover frequency is 80 Hz, the delay may be set to 6.25 milliseconds (i.e. half the full-cycle period of an 80 Hz frequency), which corresponds to a path length difference of approximately 2.14 meters between the in-phase and antiphase signals. The delay circuit may introduce the delay in the digital domain, but such delay may also be implemented before or after the signal is converted to the digital domain.

In one embodiment, multiple amplified channels are provided with one dedicated amplifier channel servicing the in-phase driver pair(s), and a second dedicated amplifier channel servicing the out-of-phase driver pair(s) (a single amplifier may be used to supply all drivers in monopole mode, however at least two amplifiers are necessary for dipole and cardioid modes). It is also possible to furnish a separate amplifier channel for each individual driver. The amplifiers may be integrated into the driver enclosure or may be freestanding.

It should be understood that the analog-digital converter, the digital delay circuit, and the digital-analog converter may all be combined on a single circuit board, or implemented in different enclosures. If implemented on a single circuit board, the electronics may be integrated into the speaker cabinets or implemented into a stereo amplifier comprising the amplifiers.

Equalization, digital or analog, shall also be provided to raise the low-frequency response of the system.

The operation of an exemplary embodiment will now be described.

In one embodiment, a monophonic audio signal is received by the system. As shown in FIG. 4, the audio signal may be an analog signal or a digital signal. A digital signal may be passed directly to the delay circuit 430 without further processing, while an analog signal is first received by analog-digital converter 420 and converted to the digital domain. The system may be able to receive both analog and digital signals and make a determination as to further processing. In alternate embodiments, the system may be implemented to receive only signals in the analog domain or only signals in the digital domain.

The digital signal may be copied by any means known in the art. Digital delay circuit 430 then delays the copied signal by a constant amount of time (zero in monopole mode, e.g., 0.5-2.0 milliseconds in dipole mode, and e.g., 6.25 milliseconds to achieve a cardioid crossover frequency of 80 Hz), or potentially by an amount of time that varies with frequency.

Phase inversion can be accomplished in a variety of ways; in one embodiment, phase inversion is not used in monopole mode. Alternatively, phase inversion may be achieved by reversing the polarity of the drive wires from the amplifier to the relevant pair of audio drivers.

A digital-analog converter 440*a*, 440*b* having the capability to process two channels receives two streams of digital data, which are identical except for delay (and possibly phase inversion and amplitude, depending on output mode) from a digital circuit 430 offering delay capability. In one embodiment equalization is applied digitally—this can be before or after the delay circuit. However equalization may instead be applied solely in the analog domain, or as a combination of digital and analog equalization elements.

The delayed and undelayed analog signals are then applied to a pair of amplifiers 450*a*, 450*b*, one for each of the undelayed and delayed signals. In one embodiment, amplifiers 450*a*, 450*b* are functionally identical, differing only in their power output if at all (amplifiers should not differ in monopole and dipole mode, but may differ in cardioid mode). Each amplified signal is then applied to an identical pair of specially configured audio drivers.

The signals may be equalized at various points along the signal path. For example, equalization may take place in the analog domain; in the digital domain before the signal is split into undelayed and delayed streams; in the digital domain after the signal is split; and in the analog domain following digital-analog conversion.

In an exemplary embodiment of four drivers, one pair of drivers may be driven with equalization but no delay via amplifier 450*a*. A second pair of drivers may be driven in-phase (in monopole model) or with inverted phase (in dipole and cardioid modes) by amplifier 450*b*. In dipole mode the phase-inverted signal is delayed by a constant amount and is not attenuated compared to the in-phase signal, while in cardioid mode the phase-inverted signal may be delayed either by a constant amount or optionally by a frequency-dependent delay. In cardioid mode attenuation, or additional amplification, of the phase-inverted signal may optionally be employed.

In certain embodiments, the speaker system provides: selectable directivity (monopole, dipole, or cardioid) with controlled directivity in dipole and cardioid modes (with the specific radiation pattern characteristics adjustable via the chosen electronic delay of out-of-phase signal); frequency response in cardioid mode that depends solely on the drivers, the chosen ELF cabinet volume, equalization level, and associated amplifiers (rather than on room dimensions or on a larger and potentially inconvenient cabinet volume determined by Thiele-Small modeling techniques); cancellation of mechanical forces transmitted by the drivers into the cabinets; and cancellation of even-order harmonic distortion including in particular second-order harmonic distortion; all in a compact assembly suitable for home or studio use.

In some embodiments, an in-phase driver pair generates the primary sound wavefront. In monopole mode, all drivers are provided with the same signal without delay or phase inversion. In dipole and cardioid modes, the out-of-phase driver pair generates an inverted, delayed wavefront that provides selective cancellation (i.e., destructive interference). If the out-of-phase drivers are operated with minimal delay (e.g. 0.5-2 milliseconds), the resulting radiation pattern will closely approximate a conventional dipolar pattern, which may be desirable for some listeners. With progressively greater delays, selective cancellation results in controlled directivity with a cardioid radiation pattern. As described above, a cardioid radiation pattern provides for a broader listener sweet spot and reduced peaks and nulls in frequency response compared to an otherwise similar monopole speaker, as well as lower-frequency output than is achievable in a dipole system with the same driver and amplifier complements. The following table summarizes the differences in operational settings between different output modes:

| Mode | Phase inversion of copied input signal | Delay of phase inverted signal | Attenuation of phase inverted signal |
|---|---|---|---|
| Monopole | No | No | No |
| Dipole | Yes | Yes (e.g. 0.5-2 ms) | No |
| Cardioid | Yes | Yes (e.g. 6-7 ms) | Optional |

The electronic delay circuit may be used to maintain a fixed delay at all frequencies (or potentially a frequency-dependent delay) of the out of phase output. In some embodiments, the electronic delay is adjustable in cardioid mode to provide varying crossover points to associated satellite or main speakers. (As the crossover point rises, the required delay declines, to a point at which the delay will be so short that the system delay is the same as in the dipole mode. For example, a dipole implemented with 2 millisecond delay of out-of-phase signals may have the identical delay, though not necessarily the same out-of-phase signal amplitude, as a cardioid implemented with a 500 Hz crossover point, and a dipole implemented with 0.5 millisecond delay may have identical delay to a cardioid implemented with a 2000 Hz crossover point.)

Electronic delay differs from mechanical delay (e.g. provided by holes introduced into the cabinets of the in-phase driver pair and filled with acoustic resistance elements such as fiberglass batting) as it provides perfect control of the delay of out-of-phase signal regardless of frequency. Furthermore, electronic control is superior to mechanical attempts to implement a cardioid speaker as attenuation (whether zero or nonzero) of the out of phase signal remains constant with variations in output frequency and level. Electronic control finally permits user-selectable output directivity mode without compromise, e.g. monopole, dipole, or cardioid.

In some embodiments, the driver mounting scheme provides even-order harmonic distortion cancellation, in particular second harmonic distortion cancellation. Motional transducers may produce even-order harmonic distortion products, i.e. undesired outputs with frequencies at even-integer multiples of the input frequency (e.g. a 40 Hz input signal may have a second harmonic distortion product at 80 Hz, a fourth order distortion product at 160 Hz, a $6^{th}$ order product at 240 Hz, etc., with the second harmonic distortion product typically the most pronounced in amplitude). By arranging a pair of similar drivers such that the even-order harmonic distortion products of one driver emitted from the "front" of the driver meet the out-of-phase even-order harmonic distortion products emitted from the "rear" or opposite side of a similar driver, the even-order harmonic distortion products, in particular the second harmonic distortion product, are subject to destructive cancellation and are substantially attenuated, potentially by 10 dB or more.

The crossbars and braces provided in the illustrated embodiment provide cancellation of forces transmitted from the drivers to the enclosures, thereby minimizing vibration of the overall assembly that would otherwise result in unwanted noise.

The system described herein may be characterized as a compact sealed enclosure system. Known low frequency speakers utilize the enclosure chamber to capture the out-of-phase signal created by the rear side of the driver while maintaining a large enough enclosed volume so as to provide moderate or minimal enclosure pressure as the driver compresses and alternately rarefies the enclosed air volume. Such a configuration utilizes conventional Thiele-Small modeling techniques to determine an enclosure volume sufficient for the chosen driver to meet the desired performance characteristics. By employing extended low frequency ("ELF") loading that operates the driver below its fundamental resonance frequency as-mounted in the cabinet and by providing additional amplifier power, the size of the enclosure may be significantly reduced compared to a speaker employing conventional Thiele-Small approaches that operate the driver above its fundamental resonance frequency as-mounted in the cabinet. Additionally, given adequate driver surface area, excursion capability, appropriate equalization, and amplifier power, when the speaker is operated in cardioid or monopole mode, it exhibits arbitrarily low frequency response unlike a dipole design.

Lastly, equalization of the low frequencies is provided in some embodiments to maintain flat frequency response to the limits set by driver area, excursion limit, cabinet volume, and amplifier power.

Figure 5:
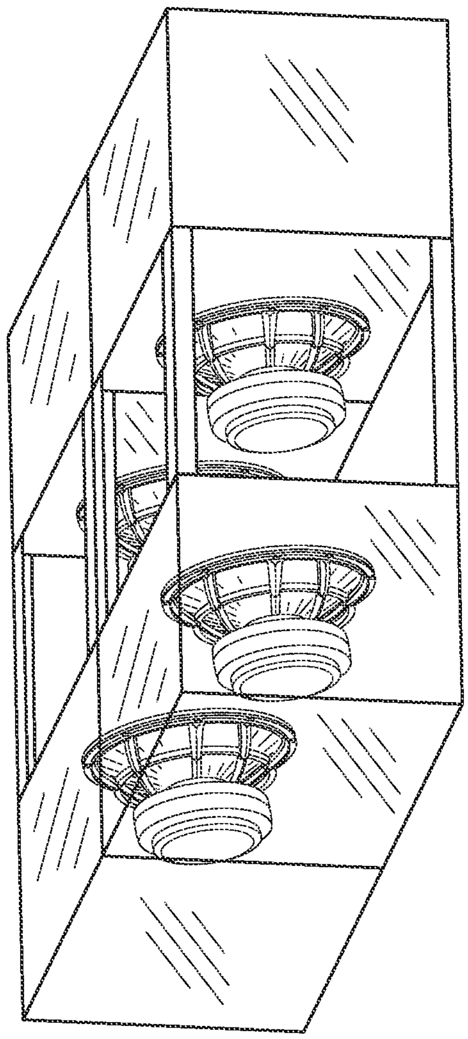
FIG. 5 is a perspective view of an alternative configuration of a loudspeaker assembly.
Figure 6:
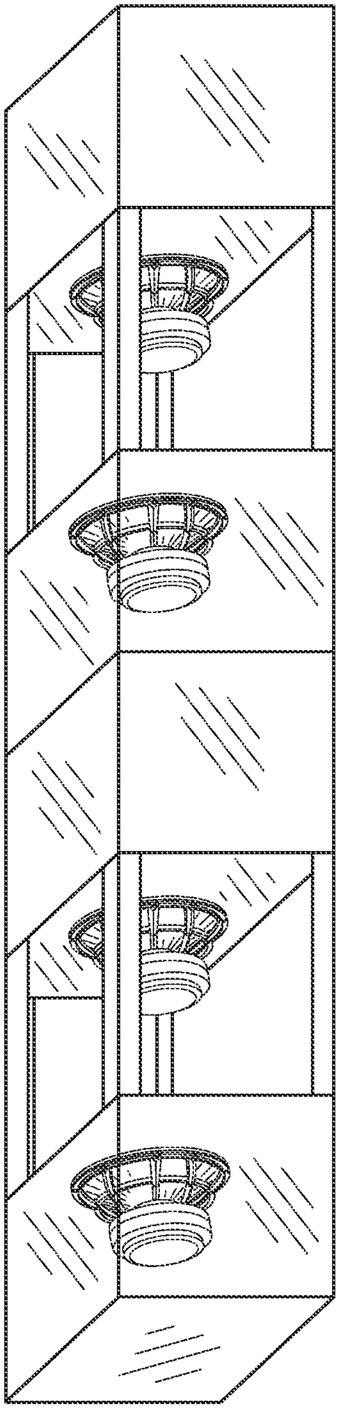
FIG. 6 is a perspective view of another alternative configuration of a loudspeaker assembly.
Figure 7:
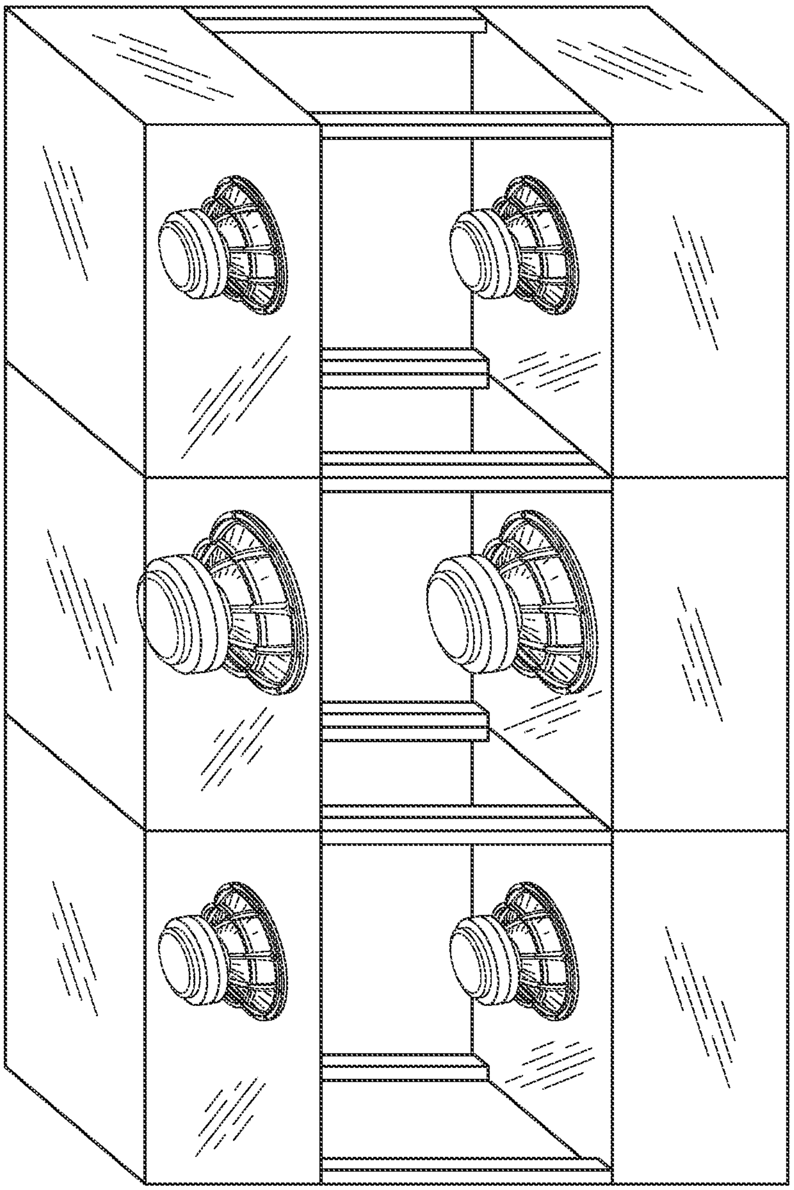
FIG. 7 is a perspective view of yet another alternative configuration of a loudspeaker assembly.

Variations on the driver configuration described above may be employed and remain within the scope of the invention. For example, the speaker system can be extended in multiples of four driver units. Alternatively, the speaker system could be extended in threes with two pairs of in-phase drivers and a single pair of out-of-phase drivers (in monopole mode all drivers operate in-phase). The system may employ identical drivers for in-phase driver pairs but a different driver type for out-of phase driver pairs. In alternative embodiments, stacking driver pairs vertically may minimize the required floor space for a floor-mounted speaker, although it is possible to arrange the driver pairs in other configurations. For example, an in-phase pair in each group of four drivers could be positioned in "front" (i.e., closer to the listener) with the out-of-phase pair directly behind the in-phase drivers. Alternatively, the driver pairs could be positioned laterally such that a single axis would run through the center of each driver motor structure. FIGS. 5-7 show three exemplary variations, although numerous alternative forms are contemplated.

It will be understood that there are numerous modifications of the illustrated embodiments described above which will be readily apparent to one skilled in the art, such as many variations and modifications of the compression connector assembly or its components including combinations of features disclosed herein that are individually disclosed or claimed herein, explicitly including additional combinations of such features, or alternatively other types of contact array connectors. Also, there are many possible variations in the materials and configurations. These modifications or combinations fall within the art to which this invention relates and are intended to be within the scope of the claims, which follow. It is noted, as is conventional, the use of a singular element in a claim is intended to cover one or more of such an element.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present application has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the application, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. A speaker system comprising:

a plurality of pairs of sealed speaker cabinets;

first and second speaker drivers mounted to each of the pairs of sealed speaker cabinets, wherein each sealed speaker cabinet houses a driver, wherein each driver faces outward from the sealed speaker cabinet in which it is mounted, wherein each driver is a low-frequency driver for reproducing bass frequencies in a range including 200 Hz; and an audio processing apparatus configured to receive a first audio signal and to process the first audio signal to generate a second audio signal, wherein the first audio signal is delivered to the first and second speaker drivers in at least one of the pairs of sealed speaker cabinets, and the second audio signal is delivered to the first and second speaker drivers in at least one other of the pairs of sealed speaker cabinets, wherein the first audio signal is configured to operate the first and second speaker drivers in the at least one of the pairs of sealed speaker cabinets below a fundamental resonance frequency of the first and second speaker drivers as mounted in the at least one of the pairs of sealed speaker cabinets, and the second audio signal is configured to operate the first and second speaker drivers in the at least one other of the pairs of sealed speaker cabinets below a fundamental resonance frequency of the first and second speaker drivers as mounted in the at least one other of the pairs of sealed speaker cabinets, wherein each sealed speaker cabinet in each pair of sealed speaker cabinets is rigidly secured, either directly or indirectly, to the other sealed speaker cabinet in that pair of sealed speaker cabinets and the first and second speaker drivers are oriented in a manner to minimize vibration producted by forces transmitted from the first and second speaker drivers to the respective pair of sealed speaker cabinets.

2. The speaker system of claim 1 wherein the audio processing apparatus further includes a digital-to-analog and analog-to-digital converter.

3. The speaker system of claim 1 wherein the audio processing apparatus is configured to apply a phase inversion to the first audio signal to generate the second audio signal.

4. The speaker system of claim 1 wherein the audio processing apparatus is configured to apply a delay to the first audio signal to generate the second audio signal.

5. The speaker system of claim 4 wherein the delay is adjustable.

6. The speaker system of claim 1 wherein the audio processing apparatus is provided within one of the sealed speaker cabinets.

7. The speaker system of claim 1, further comprising braces connected between one sealed speaker cabinet in a pair to the other sealed speaker cabinet in the pair of sealed speaker cabinets.

8. The speaker system of claim 1 wherein each sealed speaker cabinet is rigidly secured via a shared surface to the other sealed speaker cabinet in the pair of sealed speaker cabinets.

9. The speaker system of claim 1 in which the first and second speaker drivers are identical.

10. The speaker system of claim 1 wherein the plurality of pairs of sealed speaker cabinets includes six sealed speaker cabinets configured as three pairs of sealed speaker cabinets, with the first audio signal delivered to speaker drivers mounted to two pairs of the sealed speaker cabinets, and the second audio signal delivered to speaker drivers mounted to the remaining pair of sealed speaker cabinets.

11. The speaker system of claim 1 wherein the first audio signal and the second audio signals are provided to an equal number of drivers in the speaker system.

12. The speaker system of claim 1 wherein the second audio signal is provided to fewer speaker drivers in the speaker system than the first audio signal.

13. A speaker system comprising:

a first pair of sealed speaker cabinets, including a first sealed speaker cabinet rigidly secured to a second sealed speaker cabinet;

a first speaker driver mounted in the first sealed speaker cabinet, wherein the first speaker driver has a first side that emits primary sound radiation and a second side opposite the first side, and wherein the first side of the first speaker driver faces outward from the first sealed speaker cabinet;

a second speaker driver mounted to the second sealed speaker cabinet, wherein the second speaker driver has a first side that emits primary sound radiation and a second side opposite the first side, and wherein the first side of the second speaker driver faces toward an inside of the second sealed speaker cabinet;

a second pair of sealed speaker cabinets, including a third sealed speaker cabinet rigidly secured to a fourth sealed speaker cabinet;

a third speaker driver mounted in the third sealed speaker cabinet, wherein the third speaker driver has a first side that emits primary sound radiation and a second side opposite the first side, and wherein the first side of the third speaker driver faces outward from the third sealed speaker cabinet, wherein the third speaker driver is a subwoofer having a frequency range including 200 Hz;

a fourth speaker driver mounted to the fourth sealed speaker cabinet, wherein the fourth speaker driver has a first side that emits primary sound radiation and a second side opposite the first side, and wherein the first side of the fourth speaker driver faces toward an inside of the fourth sealed speaker cabinet; and an audio processing apparatus in signal communication with the first and second speaker drivers and configured to receive a first audio signal and to delay and invert a phase of the first audio signal to generate a second audio signal, wherein the first audio signal is delivered to the first and second speaker drivers, and wherein the second audio signal is delivered to the third and fourth speaker drivers.

14. The speaker system of claim 13, wherein the audio processing apparatus is configured to not attenuate the second audio signal.

15. The speaker system of claim 13, wherein the audio processing apparatus is configured to delay the first audio signal by between 0.5-2.0 milliseconds.

16. The speaker system of claim 15, wherein the audio processing apparatus is configured to delay the first audio signal by a constant amount.

17. A speaker system comprising:

a pair of sealed speaker cabinets, including a first sealed speaker cabinet rigidly secured to a second sealed speaker cabinet;

a first speaker driver mounted in the first sealed speaker cabinet, wherein the first speaker driver has a first side that emits primary sound radiation and a second side opposite the first side, and wherein the first side of the first speaker driver faces outward from the first sealed speaker cabinet, wherein the first speaker driver is a low-frequency driver for reproducing bass frequencies in a range including 200 Hz;

a second speaker driver mounted to the second sealed speaker cabinet, wherein the second speaker driver has a first side that emits primary sound radiation and a second side opposite the first side, and wherein the first side of the second speaker driver faces toward an inside of the second sealed speaker cabinet, wherein the second speaker driver is a low-frequency driver for reproducing bass frequencies in a range including 200 Hz; and an audio processing apparatus in signal communication with the first and second speaker drivers and configured to receive a first audio signal and to process the first audio signal to generate a second audio signal, wherein the second audio signal is delivered to the first and second speaker drivers, wherein the second audio signal is configured to operate the first and second speaker drivers below a fundamental resonance frequency of the first and second speaker drivers as moounted in the pair of sealed speaker cabinets, wherein the first and second speaker drivers and the pair of sealed speaker cabinets are oriented in a manner to minimize vibration produced by forces transmitted from the first and second speaker drivers to the pair of sealed speaker cabinets.

18. The speaker system of claim 17, further comprising:

a second pair of sealed speaker cabinets, including a third sealed speaker cabinet rigidly secured to a fourth sealed speaker cabinet;

a third speaker driver mounted in the third sealed speaker cabinet, wherein the third speaker driver has a first side that emits primary sound radiation and a second side opposite the first side, and wherein the first side of the third speaker driver faces outward from the third sealed speaker cabinet; and a fourth speaker driver mounted to the fourth sealed speaker cabinet, wherein the fourth speaker driver has a first side that emits primary sound radiation and a second side opposite the first side, and wherein the first side of the fourth speaker driver faces toward an inside of the fourth sealed speaker cabinet.

19. The speaker system of claim 18, wherein the first audio signal is delivered to the third and fourth speaker drivers.

* * * * *